Jan. 6, 1959  Q. C. JOHNSON  2,867,396
RELEASABLE AIRCRAFT TANK MOUNTING
Filed June 4, 1957  2 Sheets-Sheet 1

INVENTOR.
QUINTON C. JOHNSON
BY
Wade Koontz
Arnold H. Leof
ATTORNEYS

Jan. 6, 1959
Q. C. JOHNSON
2,867,396
RELEASABLE AIRCRAFT TANK MOUNTING
Filed June 4, 1957
2 Sheets-Sheet 2
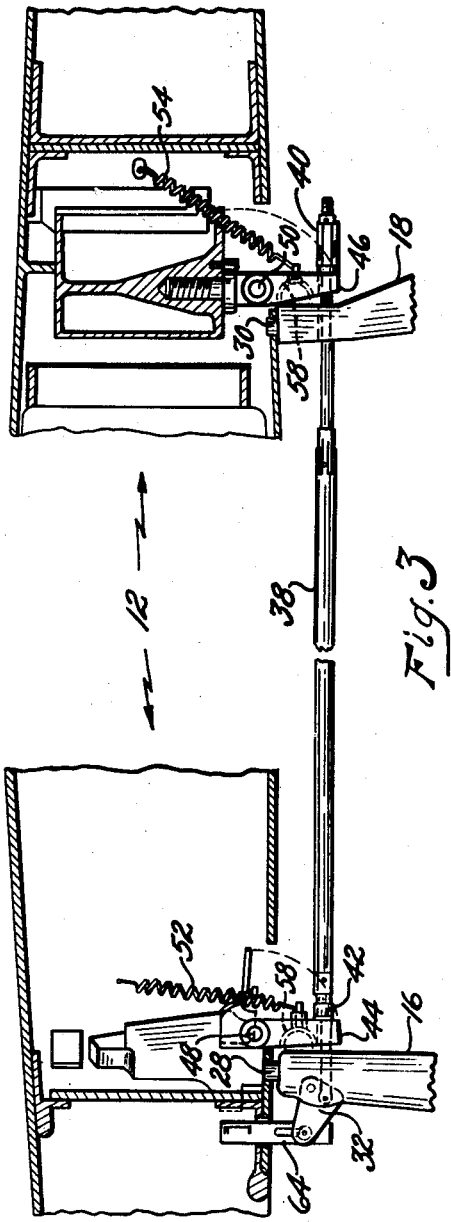
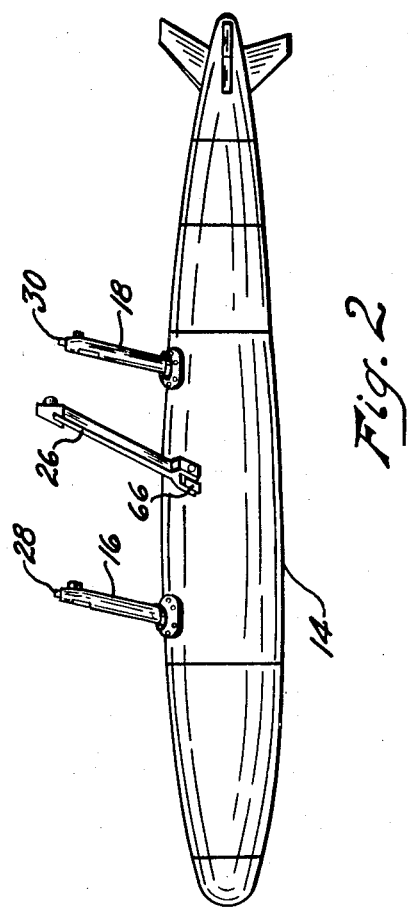
INVENTOR.
QUNITON C. JOHNSON
BY
ATTORNEYS

United States Patent Office 2,867,396
Patented Jan. 6, 1959

2,867,396

RELEASABLE AIRCRAFT TANK MOUNTING

Quinton C. Johnson, Torrance, Calif., assignor to the United States of America as represented by the Secretary of the Air Force Application June 4, 1957, Serial No. 663,557

9 Claims. (Cl. 244—137)

This invention relates to mechanism for the release of jettisonable equipment such as auxiliary fuel tanks, suspended from the wings of aircraft, and releasable therefrom in flight when empty or in the event of emergency.

The development of high speed aircraft, particularly those of the jet powered type which consume large quantities of fuel, has created a need for the provision of auxiliary fuel storage means which can be carried by the aircraft until the fuel supply stored therein has been exhausted and which can then be jettisoned to reduce the drag and over-all weight of the aircraft thereby facilitating its return to the home base. Although my invention will be described as utilized in the suspension of disposable fuel tanks from aircraft, it is not intended that the use of the invention be limited to any particular object since it is obvious that various types of objects, such as bombs, or food or weapon containers, could be carried by an aircraft equipped with my invention.

Accordingly, it is a primary object of my invention to provide a means for temporarily supporting disposable or jettisonable objects upon an aircraft wing or the like.

A further object of my invention is to provide such a means wherein the supporting structure is retracted into the wing upon release of the object carried.

It is also an object of this invention to provide a release mechanism which is both sturdy and dependable while being of relatively simple and inexpensive construction.

The above and still further objects of my invention will become apparent upon consideration of the following detailed description thereof, especially when taken in conjunction with the accompanying drawings, in which:

Figure 2 is a pictorial view of the tank in Figure 1, but with the fairing removed;

Figure 3 is a transverse section through a portion of the aircraft wing showing the support members on both the wing and the tank;

Figure 1:
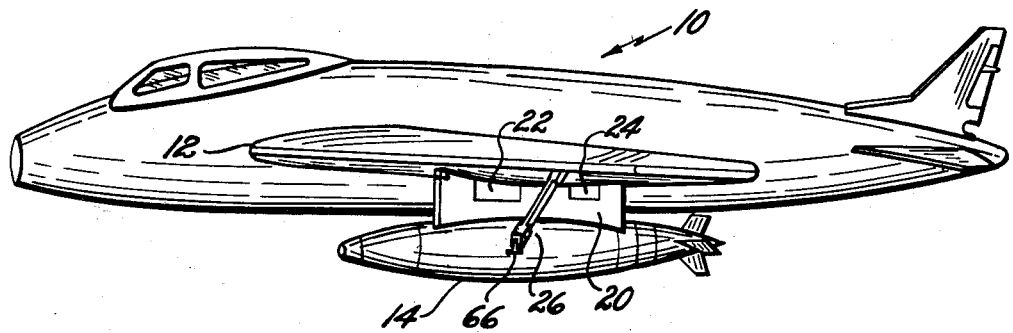
Figure 1 is a pictorial view of an aircraft wing having a releasable tank mounted thereon.

Turning specifically to the drawings in which like characters of reference indicate like parts, an aircraft 10 having a wing 12 is shown in Figure 1. Suspended from said wing along an axis parallel to that of the aircraft is a tank 14. Although the tank illustrated is of the type used to carry an auxiliary gas supply, it should be noted that many other types of tanks for carrying different materials or objects are equally well suited for use with my invention.

A pair of tank supporting posts 16 and 18 are rigidly mounted on the tank 14. The posts are positioned toward the front (16) and rear (18) ends of said tank, and serve to attach the tank to the wing of an aircraft as hereinafter described. In order to shield said posts, and also to decrease drag in flight, a streamlined fairing 20 fits around the posts between the tank and the wing. A pair of access openings in said fairing are covered by removable plates 22 and 24, and permit adjustments to be made after the entire assembly is in place. In addition to the tank posts, a sway brace 26 also serves to hold the tank in place.

Figure 4:
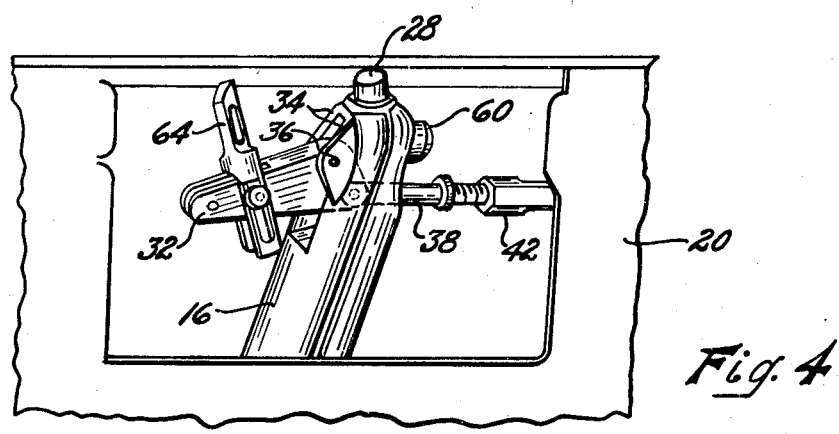
Figure 4 is an enlarged view of the forward support arrangement.

In order to properly position the tank 14, the front and rear posts are provided with positioning studs 28 and 30 respectively. These studs extend from the tops of said posts and are received in openings in the lower wing face as best seen in Figure 3. The front post 16 has a transverse aperture therethrough. A bellcrank 32 has its shorter leg extending into said aperture. A pair of ears 34, formed adjacent one side said aperture, receive a pivot pin 36. This pin passes through said bellcrank between the ears 34 (as shown in phantom in Figure 4), and serves as a central pivot for the former.

Inside said aperture, the end of the bellcrank 32 is attached to one extremity of a shaft 38. The latter extends rearwardly from the aperture in post 16 and passes through an aligned hole in the rear post 18. The rear end of said shaft is threaded and receives a tension adjusting nut 40. The shaft 38 is also threaded directly to the rear of the post 16, and a second tension adjusting nut 42 engages said latter threads. The purpose of said nuts will be fully described below.

Carried within the framework of the wing are front and rear tank mounts 44 and 46. These members are pivotally supported at 48 and 50 respectively, and they are of such a length as to extend downwardly beyond the wing through slots provided for them. A tension spring 52 has one end fixed within the wing 12 and its other end attached to the front tank mount 44. Said spring serves to bias said mount for counterclockwise rotation toward a retracted position within said wing. A duplicate spring 54 serves an identical purpose with respect to the rear tank mount 46. The pivots 48 and 50 may be suspended within the wing framework in any conventional manner, one such being shown at the right hand side of Figure 3.

Figure 5:
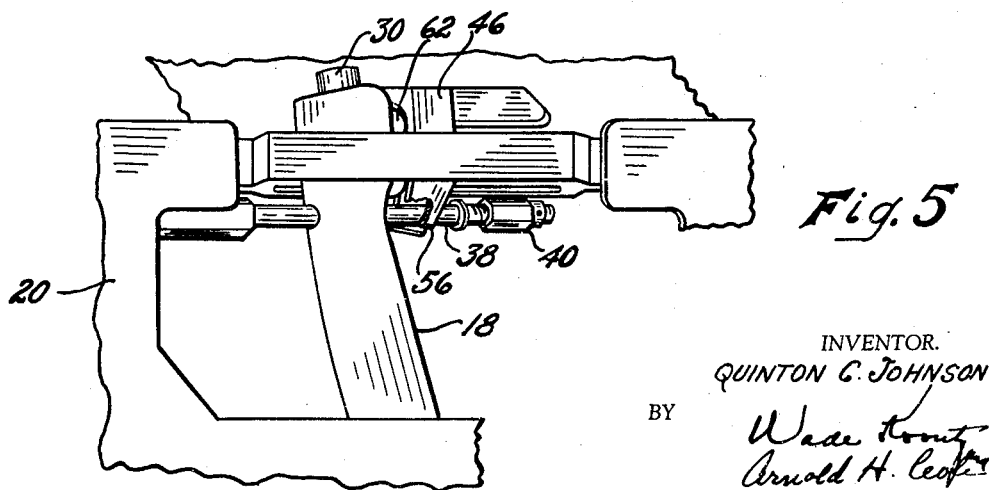
Figure 5 is an enlarged view of the aft support arrangement.

When the front and rear tank mounts pass through the wing 12, said mounts each terminate in a forked portion 56 seen best in Figure 5. The space between the prongs of such forked portions is of a size to receive the shaft 38. Located centrally of each of the mounts 44 and 46 is a socket 58. A ball 60 formed on the front tank post 16 fits into the socket in the front tank mount, and a similar ball 62 on the post 18 cooperates in the same fashion with the socket in the rear tank mount. The longer leg of the pivoted bellcrank 32 is loosely connected to a link member 64. This connection takes the form of a slot in said link member engaged by a pin which also passes through said bellcrank. The link 64 passes through an aperture in the wing 12 and is latched to a release mechanism (not shown). The mechanism should preferably be a remotely controlled device capable of operation by the pilot of the aircraft from a convenient point in the cockpit. One type of release mechanism which might be employed is described in my co-pending application Serial No. 634,802, filed January 17, 1957. Although only one wing of the aircraft has been described here, it is apparent than an identical structure is to be used for mounting a tank on the other wing.

In assembling the device and mounting the tank, the first step is to secure the front and rear posts, 16 and 18, to the wing 12. At this point it should be noted that both the tank and the wing are provided with fuel lines and means for connecting said lines. For the sake of clarity these elements have not been shown. Such structure forms no part of the present invention, and it suffices to state that the connecting means may take the form of any desired quick-disconnect coupling. This enables the lines to part easily when the tank is released. Also secured to the tank, as at 66, is a sway brace fitting to which the sway brace 26 is attached. The fairing 20 is then set in position on the tank with the access plates 22 and 24 removed to permit attachment to the wing.

The tank is placed under said wing, and the positioning studs 28 and 30 are aligned with the apertures provided for them. The front tank mount 44 is pivoted downwardly against its bias, and the forked end thereof straddles the shaft 38 adjacent the tank post 16. The nut 42 is then adjusted to hold said mount in position. A similar procedure is then followed with the rear tank mount 46, and the nut 40 serves to hold said latter mount in place. The link member 64 is inserted into the wing and attached to the release mechanism, and further tensioning adjustments of the nuts 40 and 42 are made. Finally, the sway brace is connected to a fitting on the wing. This last fitting is of a type which releases upon rotation or translation of the brace. The plates 22 and 24 are fixed in place, and the aircraft is ready for flight.

When the fuel supply in a tank is exhausted, or due to some emergency condition it is found necessary to dispose of the tank, such action is initiated by the pilot. He actuates the above-mentioned release mechanism (not shown) whereby the link member 64 is freed and hangs loosely. The weight of the tank 14, and the flow of air thereagainst, will tend to rotate the tank mounts 44 and 46 upward. The bellcrank 32 is now free to pivot around the pin 36 in a counterclockwise direction. Such pivotal motion of said bellcrank moves its shorter arm, and consequently the shaft 38 attached thereto, rearwardly. Since said shaft carries adjusting nuts 40 and 42, the latter are thus moved from their position of holding the mounts 44 and 46 against the tank posts. When this holding force is relieved, the forked ends 56 of said mounts are now pulled away from their straddling position on the shaft 38. Then the weight of the tank will cause balls 60 and 62 on the tank posts to separate from their sockets in the mounts. When the downward swing of the tank causes the necessary rotation or translation of the brace, its connection to the wing parts and the tank fall away from the aircraft. Springs 52 and 54 retract the tank mounts into the wing, and the wing now presents a smooth, drag-reducing surface.

Although the embodiment just described refers to a single tank mounted on one wing of an aircraft, it should be clear that the principles of my invention may be equally well used to mount a plurality of tanks or similar objects on each wing of said aircraft. Further, such objects might alternatively be supported beneath any portion of the fuselage proper. The only limitations in these cases would involve the aerodynamics of the particular aircraft involved. It is therefore to be understood that the above-described arrrangement is merely illustrative of the principles of my invention. Numerous other arrangements may be devised by those skilled in the art without departing from the spirit and scope of the invention.

What is claimed is:

1. A device for releasably mounting objects on an aircraft comprising a front and a rear post fixed to an object to be carried, shaft means passing through an aperture in each post and extending therefrom, a pair of pivoted members suspended from said aircraft, one of said members being positioned adjacent each post, means urging said members away from said posts, forked means on said members for straddling said shaft means, cooperating ball and socket means between each of said posts and its adjacent member, adjustable means on said shaft, a part of said adjustable means abutting each of said members, and pivoted link means releasably held between said shaft and said aircraft and holding said shaft against longitudinal movement.

2. A device as defined in claim 1 wherein said urging means comprise tension springs to retract said pivoted members into the aircraft upon said separation, and said adjustable means includes a pair of nuts coacting with threaded portions on said shaft means.

3. A device as defined in claim 1 and further comprising a positioning stud on each of said posts for insertion into chosen apertures in said aircraft, said link means including a bellcrank pivoted between said shaft and a slotted lever, the latter being detachably connected to the aircraft.

4. A device for releasably mounting objects on an aircraft comprising a pair of mounts each having a bifurcated end, means pivotally attaching the other end of each of said mounts in spaced relation on an aircraft, spring means biasing said mounts in one direction, a pair of tank posts fixed in a similar spaced relation on an object to be carried, said posts having aligned apertures which slidably receive a shaft, the bifurcated ends of said mounts riding on said shaft, threaded means on said shaft and adjustable to hold said last named ends in contact with said posts, fitted means coacting between said mounts and said posts to assist in maintaining such contact, and releasable means between said shaft and said aircraft for holding said shaft in a position whereby said threaded means perform their holding function.

5. A device as defined in claim 4 in which the releasable means includes a bellcrank pivoted to one of said posts, one arm of said bellcrank being connected to said shaft.

6. A device as defined in claim 5 wherein said releasable means further includes a lever member detachably held at one of its ends to the aircraft, and having its other end connected to the other arm of said bellcrank.

7. A device as defined in claim 4 in which said pivotal attachment of the mounts is within the aircraft and said mounts are of a size to extend outside of said aircraft through a pair of apertures, said spring means urging said mounts to a retracted position within said aircraft.

8. A device as defined in claim 7 wherein said spring means are a pair of tension springs, each of said springs having one end fixed to the aircraft and the opposite end attached to one of said pivoted mounts, and said fitted means comprising a ball on each of said posts cooperating with a socket formed in each of said mounts.

9. A device of the class described comprising a member to be carried by an aircraft, a front and a rear post fixed to said member in spaced relationship, aligned openings in said front and rear posts, a rigid shaft passing completely through the opening in the rear post and partially through the opening in the front post, said shaft being slidable in said openings, a bellcrank partially within said last-named opening and having a connection with said shaft, said bellcrank being pivoted on said front post and also having a connection to a one end of a link, the other end of said link being releasably connected to said aircraft, a front mount pivoted within said aircraft and extending therefrom adjacent the front post, a rear mount pivoted within said aircraft and extending therefrom adjacent said rear post, cooperating ball and socket means between adjacent posts and mounts, forked portions on said extended mounts straddling said shaft, a pair of adjustable nuts on said shaft holding adjacent posts and mounts together, and springs mounted within said aircraft and urging said mounts to pivot away from said posts.

References Cited in the file of this patent
UNITED STATES PATENTS

| | | |
|---|---|---|
| 1,480,582 | Weed | Jan. 15, 1924 |
| 2,591,913 | Bowers et al. | Apr. 8, 1952 |
| 2,807,193 | Roberts et al. | Sept. 24, 1957 |
| 2,809,557 | Johnson | Oct. 15, 1957 |

OTHER REFERENCES

"Aero Digest," April 1951, pp. 21 and 22.